(12) United States Patent
Janssens et al.

(10) Patent No.: US 10,081,010 B2
(45) Date of Patent: *Sep. 25, 2018

(54) METHOD FOR PRODUCING METAL EXCHANGED ZEOLITES BY SOLID-STATE ION EXCHANGE AT LOW TEMPERATURES

(71) Applicant: Haldor Topsøe A/S, Kgs. Lyngby (DK)

(72) Inventors: Ton V. W. Janssens, Bagsværd (DK); Peter N. R. Vennestrøm, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/126,171

(22) PCT Filed: Oct. 15, 2014

(86) PCT No.: PCT/EP2014/072144
§ 371 (c)(1),
(2) Date: Sep. 14, 2016

(87) PCT Pub. No.: WO2015/154828
PCT Pub. Date: Oct. 15, 2015

(65) Prior Publication Data
US 2017/0095804 A1  Apr. 6, 2017

(30) Foreign Application Priority Data

Apr. 7, 2014 (DK) .................. 2014 00199
Aug. 26, 2014 (DK) .................. 2014 00475

(51) Int. Cl.

| | | |
|---|---|---|
| B01J 29/46 | (2006.01) | |
| B01D 53/94 | (2006.01) | |
| B01J 37/00 | (2006.01) | |
| B01J 29/06 | (2006.01) | |
| B01J 29/072 | (2006.01) | |
| B01J 29/14 | (2006.01) | |
| B01J 29/24 | (2006.01) | |
| B01J 29/68 | (2006.01) | |
| B01J 29/76 | (2006.01) | |
| B01J 29/83 | (2006.01) | |
| B01J 29/85 | (2006.01) | |
| B01J 37/02 | (2006.01) | |
| B01J 37/04 | (2006.01) | |
| B01J 37/08 | (2006.01) | |
| B01J 37/30 | (2006.01) | |
| B01J 38/08 | (2006.01) | |

(52) U.S. Cl.
CPC .......... *B01J 29/46* (2013.01); *B01D 53/9418* (2013.01); *B01J 29/061* (2013.01); *B01J 29/072* (2013.01); *B01J 29/146* (2013.01); *B01J 29/24* (2013.01); *B01J 29/68* (2013.01); *B01J 29/763* (2013.01); *B01J 29/7607* (2013.01); *B01J 29/7615* (2013.01); *B01J 29/83* (2013.01); *B01J 29/85* (2013.01); *B01J 37/0018* (2013.01); *B01J 37/0036* (2013.01); *B01J 37/0238* (2013.01); *B01J 37/04* (2013.01); *B01J 37/08* (2013.01); *B01J 37/30* (2013.01); *B01D 2251/208* (2013.01); *B01D 2251/2062* (2013.01); *B01D 2255/20738* (2013.01); *B01D 2255/20746* (2013.01); *B01D 2255/20761* (2013.01); *B01D 2255/50* (2013.01); *B01D 2255/504* (2013.01); *B01J 38/08* (2013.01); *B01J 2229/183* (2013.01); *B01J 2229/186* (2013.01); *B01J 2229/38* (2013.01); *B01J 2229/40* (2013.01)

(58) Field of Classification Search
None
See application file for complete search history.

(56) References Cited

U.S. PATENT DOCUMENTS

| | | | | |
|---|---|---|---|---|
| 2008/0226545 | A1* | 9/2008 | Bull ................... | B01D 53/9418 423/700 |
| 2012/0047874 | A1* | 3/2012 | Schmieg ............ | B01D 53/9418 60/274 |
| 2013/0251611 | A1 | 9/2013 | Wen et al. | |

FOREIGN PATENT DOCUMENTS

| | | |
|---|---|---|
| EP | 0 955 080 A1 | 11/1999 |
| WO | WO 2007/079852 A1 | 7/2007 |
| WO | WO 2008/009454 A2 | 1/2008 |

OTHER PUBLICATIONS

B. Wichterlova et al. "Effect of Water Vapour and Ammonia on the Solid-State Interaction of Cu Oxide with Y-Type Zeolite: Preparation of Catalyst for Reduction of Nitric Oxide with Ammonia at Low Temperature," Applied Catalysis A: General, vol. 103, No. 2, 1993, pp. 269-280.

* cited by examiner

*Primary Examiner* — Sheng H Davis
(74) *Attorney, Agent, or Firm* — Blank Rome LLP

(57) ABSTRACT

Method for the preparation of a metal-exchanged zeolites or mixtures of metal-exchanged zeolites, such as Cu-SSZ-13, Cu-ZSM-5, Cu-beta, or Fe-beta, comprising the steps of providing a dry mixture of a) one or more microporous zeotype materials that exhibit ion exchange capacity and b) one or more metal compounds; heating the mixture in a gaseous atmosphere containing ammonia to a temperature lower than 300° C. for a time sufficient to initiate and perform a solid state ion exchange of ions of the metal compound and ions of the zeolite material; and obtaining the metal-exchanged zeolite material.

14 Claims, No Drawings

METHOD FOR PRODUCING METAL EXCHANGED ZEOLITES BY SOLID-STATE ION EXCHANGE AT LOW TEMPERATURES

This application is the U.S. National Phase of PCT/EP 2014/072144 filed Oct. 15, 2014 and claims priority to DKPA 2014 00199, filed Apr. 7, 2014 and DKPA 2014 00475, filed Aug. 26, 2014. The subject matter of each of the above-referenced applications is incorporated in entirety by reference.

The present invention relates to a method for the preparation of metal-exchanged zeolite materials by exposing a physical mixture of a metal oxide or a metal salt, or a combination thereof, and a zeolite material having an ion exchange capability to an atmosphere containing ammonia at a temperature below 300° C.

The ion exchange capability of zeolites originates from the fact that some of silicon atoms in the crystalline microporous framework, having a formal valence state of 4+ are isomorphously substituted by aluminium atoms with a formal charge 3+. This creates a negative charge in the zeolite crystal, which is counterbalanced by a positive ion, e.g. $H^+$, $NH_4^+$, $Na^+$ or K. Copper and iron cations can also form suitable cations to counterbalance this negative charge, which is the reason that Cu and Fe exchanged zeolites can be produced by the method described above.

Zeolite materials exchanged with Fe or Cu are effective catalysts for the catalytic reduction of $NO_x$, e.g in the exhaust of power plants, or in the exhaust of diesel engines in both stationary and automotive applications. For example Cu-beta zeolite, Fe-beta zeolite, Cu-SSZ-13, Cu-ZSM-5 are known catalysts for the removal of NOx from exhaust gases.

The catalytic reduction of $NO_x$ is referred to as SCR (selective catalytic reduction). The two best known varieties of the SCR process to reduce $NO_x$ are (1) hydrocarbon SCR (HC-SCR), in which hydrocarbons are used as a reductant, and (2) ammonia-SCR ($NH_3$-SCR) in which ammonia is used as a reductant. In the case of hydrocarbon-SCR for removal of $NO_x$ in diesel engine exhaust, the source of the hydrocarbons is the diesel fuel of the engine or residual hydrocarbons in the exhaust gas due to incomplete combustion in the engine. The common technology for using $NH_3$-SCR is by injection of urea in the exhaust gas stream, which decomposes to produce the required $NH_3$ for the SCR reaction.

A general method to produce metal-exchanged zeolite materials is by contacting a zeolite with a solution of the desired metal ion followed by filtration, washing, drying and calcination. Consequently, following this general procedure, contacting a zeolite with an appropriate solution containing Cu or Fe ions, such as Cu nitrate, Cu acetate, Fe nitrate, Cu or Fe sulfate, with a zeolite in the $H^+$, $NH_4^+$ form, or ion-exchanged with a different cation, will usually produce a material that shows catalytic activity for the SCR reaction with hydrocarbons or $NH_3$. The choice of the anion of the metal salt is in principle arbitrary, but usually anions are chosen such that sufficient solubility is obtained, is easily removed during the production, is safe to handle, and does not interact with the zeolite in an unfavourable way.

Since the conventional method for introduction of metal ions in zeolites implies handling of one or more aqueous solutions of appropriate metal salts, a production of ion-exchanged zeolites based on such methods will include filtration, drying, and finally calcination.

An alternative procedure to introduce ions in zeolite materials is by solid state ion exchange, which involves making a dry mixture of the zeolite material and a source of the cations to be introduced into the microporous crystals, followed by some appropriate treatment that will drive the cations into the microporous materials. (G. L. Price, in: J. R. Regalbuto (Ed.), Catalyst Preparation: Science and Engineering, CRC Press, Boca Raton, London, New York, 2007, pp. 283-296.)

Patent EP955080 discloses a method for the introduction of Cu, Fe, Co, Mn, Pd, Rh, or Pt in zeolites with a Si/Al ratio larger than 5 by physically mixing (i) ammonium salts, $NH_3/NH_4^+$-zeolites, or N-containing compounds, and (ii) a zeolite with a Si/Al ratio larger than 5, and (iii) an active compound chosen from a compound of one or more of the aforementioned metals at room temperature and atmospheric pressure and heated to at least 300° C. until the ion exchange process is completed, followed by cooling to room temperature. During heating, the mixture is preferably exposed to an ammonia or amine-containing atmosphere, with a heating rate higher than 10 K per minute.

We have observed that preparation of metal-exchanged zeolite materials can be achieved by solid state ion exchange at 250° C., well below the lower limit disclosed in EP955080, when it is performed by exposing a physical mixture of an oxide and/or salt of a metal and a zeolite material to an atmosphere containing gaseous $NH_3$.

The advantage of the present invention is that SCR active zeolite materials can be produced at lower temperatures, thus reducing the risk of damaging these materials during the introduction of the metal ions, and making the production process more cost effective.

Pursuant to the above observation, this invention provides a solid state ion exchange method for the preparation of a metal-exchanged zeolite material or mixtures of metal-exchanged zeolites materials comprising the steps of providing a dry mixture containing a) one or more zeolites starting materials that exhibit ion exchange capacity and b) one or more metal compounds; heating the mixture in a gaseous atmosphere containing ammonia to a temperature of up to 300° C. and for a time sufficient to initiate and perform a solid state ion exchange of ions of the metal compound and ions of the one or more zeolites; and obtaining the crystalline metal-exchanged zeolite material or the mixture of metal-exchanged zeolite materials. The zeolite material that can be used in the method according to the invention can be any zeolite material with an ion exchange capability. Preferably, the zeolite material has the crystal structure designated as AEI, AFX, CHA, KFI, LTA, IMF, ITH, MEL, MFI, SZR, TUN, *BEA, BEC, FAU, FER, MOR, LEV.

In an embodiment the one or more zeolite starting materials are selected from the group consisting of ZSM-5, zeolite Y, beta zeolite, SSZ-13, SSZ-39, SSZ-62, and Chabazite.

In a further embodiment the one or more zeolite starting materials are in the $H^+$- or $NH_4^+$-form.

In yet another embodiment the one or more zeolite starting materials contain an organic structure directing agent.

In a further embodiment the one or more metal compounds are selected from the group of metal oxides, metal nitrates, metal phosphates, metal sulfates, metal oxalates, metal acetates, or combinations thereof.

In an embodiment the metals in the one or more metal compounds are selected from the group Fe, Cu, and Co, or combinations thereof.

In an embodiment the metal compounds are CuO or $Cu_2O$ or a mixture thereof.

In an embodiment the content of ammonia in the atmosphere is between 1 and 5000 vol·ppm.

In still an embodiment the oxygen content in the atmosphere is 10 vol % or lower.

In still an embodiment the content of water in the atmosphere is 5 vol % or less.

In further an embodiment the exposure of the mixture of one or more zeolites starting materials that exhibit ion exchange capacity and one or more metal compounds to an atmosphere containing ammonia is performed at a temperature between 100 and 300° C., preferably between 150 and 250° C.

EXAMPLE 1

This example shows that an active catalyst for SCR is obtained by the method of the invention. A catalyst was prepared by mixing CuO and H-ZSM-5 zeolite to a content of 12.5 wt % CuO. A sample of the catalyst was put in a quartz-U tube reactor, and heated to 250° C. for 10 h in a gas atmosphere containing 500 ppm $NH_3$ in nitrogen. After heating, the catalyst was cooled down to 200° C. and exposed to a gas mixture of 500 ppm NO, 533 ppm $NH_3$, 5% $H_2O$, 10% $O_2$ in $N_2$, and the conversion of NO was measured at a space velocity of 2700 Nl/g cat h, as a record for the material's SCR activity.

The conversion of NO measured after a treatment of a mixture of CuO and H-ZSM-5 in $NH_3$ at 250° C. is 36.0%. For comparison, the NOx conversion, measured under the same conditions, over the untreated mixture of CuO and H-ZSM-5 is 1.4%, which indicates that the presence of gaseous $NH_3$ is essential for producing active catalysts for SCR below 300° C.

EXAMPLE 2

This example shows that it is advantageous to avoid the presence of oxygen and water under the exposure to ammonia. A catalyst sample was prepared as described in Example 1. A sample of the catalyst was put in a quartz-U tube reactor, and heated to 250° C. for 10 h in a gas atmosphere containing 500 ppm $NH_3$, and also containing 10% oxygen or both 10% oxygen and 5% water. After heating, the catalyst was cooled down to 200° C. and exposed to a gas mixture of 500 ppm NO, 533 ppm $NH_3$, 5% $H_2O$, 10% $O_2$ in $N_2$, and the conversion of NO was measured at a space velocity of 2700 Nl/g cat h, as a record for the material's SCR activity.

In the case the mixture of CuO and H-ZSM-5 was treated in a gas atmosphere containing $NH_3$ and $O_2$, the conversion was 10.6%; in the case the treatment gas atmosphere contained both $O_2$ and $H_2O$, the conversion was 2.0%.

EXAMPLE 3

This example shows that an active catalyst for SCR can be prepared below 300° C. by the method of the invention using $Cu_2O$. A dry mixture of 10 wt. % $Cu_2O$ and a H-ZSM-5 zeolite was prepared by grinding in a mortar. A sample of this mixture was placed in a quartz U-tube reactor, and heated to a predetermined temperature between 100 and 250° C. in nitrogen. After reaching the desired temperature, 500 ppm $NH_3$ was added to the gas stream for 5 hours. After this treatment the catalytic activity of the resulting material was determined by cooling to 160° C. in nitrogen, and exposing the powder mixture to a gas atmosphere consisting of 500 ppm NO, 533 ppm $NH_3$, 5% $H_2O$, 10% $O_2$ in $N_2$, and the NOx conversion was measured at a space velocity of 2700 Nl/g cat h, as a record for the material's SCR activity.

Then, the reaction temperature was increased to 180 and 200° C. and at each temperature the NOx conversion was determined under the same conditions.

The NOx conversion in the SCR reaction over the metal exchanged zeolite prepared at 100, 150, 200 and 250° C. respectively in 500 ppm $NH_3$ is given in Table 1.

TABLE 1

NOx conversion over $Cu_2O$ + H-ZSM-5 mixtures after treatment in $NH_3$ for 5 h at various temperatures

| Pretreatment temperature | NOx conv. @ 160° C. (%) | NOx conv. @ 180° C. (%) | NOx conv. @ 200° C. (%) |
|---|---|---|---|
| 100 | 0.8 | 1.9 | 6.8 |
| 150 | 1.9 | 3.9 | 10.9 |
| 200 | 4.3 | 6.9 | 14.7 |
| 250 | 12.6 | 27.7 | 58.6 |

The invention claimed is:

1. Method for the preparation of a metal-exchanged zeolite material or mixtures of metal-exchanged zeolites materials comprising the steps of providing a dry mixture containing a) one or more zeolites starting materials that exhibit ion exchange capacity and b) one or more metal compounds; heating the mixture in a gaseous atmosphere containing ammonia at a temperature of between 150° C. and 250° C. to perform a solid state ion exchange of ions of the metal compound and ions of the one or more zeolites; and obtaining the metal-exchanged zeolite material or the mixture of metal-exchanged zeolite materials, wherein the metal compound is Cu (I) oxide.

2. Method according to claim 1, wherein the one or more zeolite starting materials have the framework code of AEI, AFX, CHA, KFI, LTA, IMF, ITH, MEL, MFI, SZR, TUN, *BEA, BEC, FAU, FER, MOR, LEV.

3. Method according to claim 1, wherein the one or more zeolite starting materials are selected from the group consisting of ZSM-5, zeolite Y, beta zeolite, SSZ-13, SSZ-39, SSZ-62, and Chabazite.

4. Method according to claim 1, wherein the one or more zeolite starting materials are in the $H^+$ or $NH_4^+$ form.

5. Method according to claim 1, wherein the one or more zeolite starting materials contain an organic structure directing agent.

6. Method according to claim 1, wherein the one or more metal compounds are selected from the group of metal oxides, metal nitrates and phosphates, sulfates, oxalates, acetates or combinations thereof.

7. Method according to claim 1, wherein the content of ammonia in the atmosphere is between 1 and 5000 vol. ppm.

8. Method according to claim 1, wherein the content of oxygen in the atmosphere is 10% or lower.

9. Method according to claim 1, wherein the content of water in the atmosphere is 5 vol. % water or less.

10. Method according to claim 1, wherein the mixture of one or more zeolites starting materials that exhibit ion exchange capacity and one or more metal compounds is heated in the gaseous atmosphere containing ammonia at a temperature of between 150° C. and 250° C.

11. A metal-exchanged zeolite or mixtures of metal-exchanged zeolites obtained by a method according to claim 1.

12. A method for the removal of nitrogen oxides from exhaust gas by selective catalytic reduction with a reductant, comprising contacting the exhaust gas with a catalyst comprising a metal-exchanged zeolite or mixtures of metal-exchanged zeolites obtained by a method according to claim 1.

13. A method according to claim 12, wherein the reductant is ammonia or a precursor thereof.

14. A method according to claim 12, wherein the reductant comprises hydrocarbons.

* * * * *